United States Patent
Franco et al.

(10) Patent No.: US 7,376,140 B1
(45) Date of Patent: May 20, 2008

(54) SYSTEM AND METHOD FOR ASSIGNMENT OF ATM VIRTUAL CIRCUITS TO QUEUES IN A DSLAM

(75) Inventors: Guillermo A. Franco, Austin, TX (US); Scott W. Shumate, Austin, TX (US); James W. Edwards, III, Austin, TX (US); Michael R. Woodard, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 1226 days.

(21) Appl. No.: 10/107,014

(22) Filed: Mar. 25, 2002

(51) Int. Cl.
*H04L 12/28* (2006.01)

(52) U.S. Cl. .................. 370/412; 370/417; 370/418; 370/395.41; 370/395.43

(58) Field of Classification Search ............... 370/235, 370/389, 391, 392, 395.1, 397, 395.2, 395.4, 370/395.41, 395.42, 395.43, 412, 417–420, 370/428–429
See application file for complete search history.

(56) References Cited

U.S. PATENT DOCUMENTS

| | | | |
|---|---|---|---|
| 5,638,371 A | 6/1997 | Raychaudhuri et al. | 370/310.2 |
| 5,732,087 A * | 3/1998 | Lauer et al. | 370/416 |
| 5,864,538 A | 1/1999 | Chong et al. | 370/235 |
| 6,343,077 B1 * | 1/2002 | Chin et al. | 370/395.6 |
| 6,345,051 B1 * | 2/2002 | Gupta et al. | 370/395.2 |
| 6,424,657 B1 * | 7/2002 | Voit et al. | 370/412 |
| 6,526,060 B1 * | 2/2003 | Hughes et al. | 370/395.4 |
| 6,529,479 B1 * | 3/2003 | Suzuki | 370/236.1 |
| 6,600,741 B1 * | 7/2003 | Chrin et al. | 370/375 |
| 6,636,505 B1 * | 10/2003 | Wang et al. | 370/352 |
| 6,829,246 B2 * | 12/2004 | Silberman et al. | 370/463 |
| 6,859,442 B1 | 2/2005 | Agarwal et al. | 370/316 |
| 6,873,628 B1 * | 3/2005 | Tang | 370/480 |
| 6,876,659 B2 | 4/2005 | Aznar et al. | 370/395.1 |
| 6,879,560 B1 | 4/2005 | Cahn | 370/230.1 |
| 6,975,639 B1 * | 12/2005 | Hill et al. | 370/412 |
| 7,012,922 B1 * | 3/2006 | Unitt et al. | 370/395.1 |
| 7,023,856 B1 * | 4/2006 | Washabaugh et al. | 370/395.1 |

* cited by examiner

*Primary Examiner*—Wing Chan
*Assistant Examiner*—Mark A. Mais
(74) *Attorney, Agent, or Firm*—Baker Botts L.L.P.

(57) ABSTRACT

A method for distributing digital subscriber line (xDSL) data traffic includes receiving xDSL traffic at a DSLAM including a plurality of input ports and a plurality of output queues. Each input port includes a plurality of virtual circuits. Each of the plurality of virtual circuits are dynamically assigned to one of the plurality of output queues. The assignment of any particular virtual circuit to one of the plurality of output queues is independent of which of the plurality of input ports the particular virtual circuit is associated with. In accordance with the particular embodiment, the total number of virtual circuits is greater than a total number of output queues.

30 Claims, 2 Drawing Sheets

FIG. 2

| VIRTUAL CIRCUIT | | PRIORITY NUMBER 1 | | | | PRIORITY NUMBER 2 | | | | PRIORITY NUMBER 3 | | | | PRIORITY NUMBER 4 | | | |
|---|---|---|---|---|---|---|---|---|---|---|---|---|---|---|---|---|---|
| PORT NUMBER | VC | Q₁,₁ | Q₁,₂ | Q₁,₃ | Q₁,₄ | Q₂,₁ | Q₂,₂ | Q₂,₃ | Q₂,₄ | Q₃,₁ | Q₃,₂ | Q₃,₃ | Q₃,₄ | Q₄,₁ | Q₄,₂ | Q₄,₃ | Q₄,₄ |
| 1 | 1 | | | | | | | | | | | | | | | | |
|  | 2 | | | | | | | | | | | | | | | | |
|  | 3 | | | | | | | | | | | | | | | | |
|  | 4 | | | | | * | | | | | | | | | | | |
|  | 5 | | | | | | * | | | | | | | | | | |
|  | 6 | | | | | | | | | | | | | | | | |
| 2 | 1 | | | | | | | | | | | | | | | | |
|  | 2 | | | | | | | | | | | | | | | | |
|  | 3 | | | | | | | * | | | | | | | | | |
|  | 4 | | | | | | | | | | | | | | | | |
|  | 5 | | | | | | | | | * | | | | | | | |
|  | 6 | | | | | | | | | | | | | | | | |
| 3 | 1 | | | | | | | | | | | | | | | | |
|  | 2 | | | | | | | | | | | | | | | | |
|  | 3 | | | | | | | | | | | | | | | | |
|  | 4 | | | | | | | | | | * | | | | | | |
|  | 5 | | | | | | | | | | | | | | | | |
|  | 6 | | | | | | | | | | | | | | | | |
| 4 | 1 | | | | | | | | | | | | | | | | |
|  | 2 | | | | | | | | | | | | | | | | |
|  | 3 | | | | | | | | | | | * | | | | | |
|  | 4 | | | | | | | | | | | | | | | | |
|  | 5 | | | | | | | | | | | | | | | | |
|  | 6 | | | | | | | | | | | | | | | | |

SYSTEM AND METHOD FOR ASSIGNMENT OF ATM VIRTUAL CIRCUITS TO QUEUES IN A DSLAM

TECHNICAL FIELD OF THE INVENTION

This invention relates generally to xDSL communication, and more particularly, to a system and method for assignment of asynchronous transfer mode (ATM) virtual circuits (VCs) to queues, in a digital subscriber line access multiplexer (DSLAM).

BACKGROUND OF THE INVENTION

As communication networks provide greater connectivity and access to information, there is an increasing demand for data communication at higher rates. One solution to providing increased data rates replaces existing twisted pair wiring with high bandwidth media, such as coaxial cables or fiber optic links. Other solutions adopt improved communication techniques using the existing hardware infrastructure. For example, digital subscriber line xDSL technology provides higher bandwidth data service over existing twisted pair wiring.

xDSL data traffic is transmitted over a network having various telecommunications components, including digital subscriber line-access multiplexers (DSLAMs). A DSLAM is a distribution device for xDSL service from a central office. The DSLAM combines and separates different formats of communications contained in xDSL carriers and routes them to their respective hosts. In general, the amount of bandwidth available for transmitting communications from end users to the Internet decreases as the communications approach the Internet. Therefore, a DSLAM typically incorporates asynchronous transfer mode (ATM) switching fabric which multiplexes local subscriber traffic with user traffic arriving from subtended DSLAMs. xDSL data traffic is often buffered, and/or queued at a DSLAM, until sufficient bandwidth is available to continue along the path to the Internet, or other communication network.

SUMMARY OF THE INVENTION

The present invention includes a system and method for distributing digital subscriber line data traffic through a DSLAM that substantially eliminates or reduces disadvantages or problems associated with previously developed systems and methods. In particular, the present invention contemplates dynamically assigning each of a plurality of virtual circuits to one of a plurality of output queues based upon a predetermined algorithm.

In particular, a method for distributing digital subscriber line data traffic includes receiving xDSL traffic at a DSLAM. The DSLAM includes a plurality of input ports and a plurality of output queues. Each input port includes a plurality of associated virtual circuits. Each of the plurality of virtual circuits are dynamically assigned to one of the plurality of output queues. The assignment of any particular virtual circuit to one of the plurality of output queues is independent of which one of the plurality of input ports the particular virtual circuit is associated with. In certain embodiments, the total number of virtual circuits is greater than a total number of output queues.

In accordance with another embodiment, the assignment of virtual circuits to output queues is accomplished according to a predetermined algorithm. For example, virtual circuits may be randomly assigned to any one of the plurality of output queues. Alternatively, virtual circuits may be sequentially assigned to one of the plurality of output queues based upon an order in which connections associated with the virtual circuits are established. In accordance with another embodiment, virtual circuits are assigned to output queues in a manner that approximately evenly distributes bandwidth requirements amongst the output queues.

Technical advantages of the present include a system and method for queuing virtual circuits of an xDSL communication network, in a manner which fairly and evenly distributes available bandwidth to users. Virtual circuits are assigned to a queue each time a new connection is established. The assignment of virtual circuits to queues is independent of the port associated with the virtual circuit.

Another technical advantage of the present invention includes a system and method for assigning virtual circuits to queues, based upon a predetermined algorithm. This allows the system to intelligently distribute available bandwidth dynamically, such that each virtual circuit grants fair access to trunk port bandwidth, and maintains quality of service (QoS) for all of the virtual circuits. This also prevents any two particular virtual circuits from continuously sharing the same queue, such that one user may be disadvantaged by sharing a queue with a bandwidth abuser.

Still another technical advantage of the present invention includes a system and method for assigning virtual circuits to queues, in a quasi-random manner. The random assignment of virtual circuits to queues is accomplished with each new connection, and distributes available bandwidth to virtual circuits in a fair manner, which avoids the situation in which one particular user is continuously disadvantaged by a permanent assignment to an underperforming or over-full queue.

Yet another technical advantage of the present invention includes a system and method for assigning virtual circuits to queues in a sequential manner, based upon the time at which the connection is established. In this manner, the available bandwidth is fairly and evenly distributed amongst all virtual circuits.

Yet another technical advantage of the present invention includes a system and method for assigning virtual circuits to queues in a manner which takes into account bandwidth characteristics of one or more of the virtual circuits. Accordingly, virtual circuits are intelligently assigned to queues based upon anticipated or actual bandwidth demand of the particular queue. Bandwidth characteristics include but are not limited to peak cell rate (PCR), sustained cell rate (SCR), maximum burst size (MBS) and/or cell delay variation (CDV).

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages, reference is now made to the following description, taken in conjunction with the accompanying drawings, in which:

FIG. 2 illustrates an assignment table wherein each virtual circuit may be assigned to a particular queue associated with a DSLAM within the communications network of FIG. 1.

DETAILED DESCRIPTION OF THE INVENTION

Figure 1:
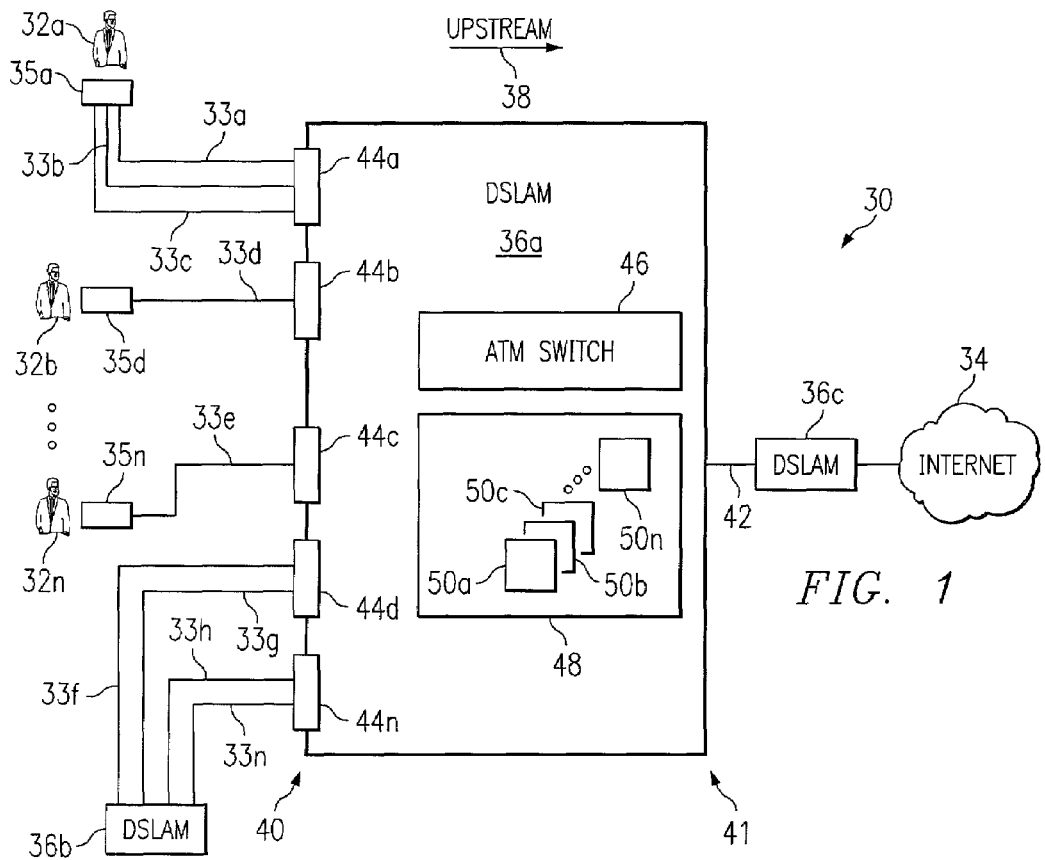
FIG. 1 illustrates a communication network in accordance with a particular embodiment of the present invention.

FIG. 1 illustrates a communication system 30, in accordance with a particular embodiment of the present invention. A plurality of xDSL subscribers 32a-32n are provided access to the Internet 34, using DSLAM 36a. DSLAM 36a is also used by one or more additional DSLAM(s)s 36b to provide Internet access to users of DSLAM(s) 36b. DSLAM 36a may be coupled directly with the Internet 34, or xDSL data traffic through DSLAM 36a may be routed through one or more additional DSLAM(s) 36c, in order to gain access to the Internet 34.

In general, the amount of bandwidth available for the transmission of xDSL data traffic is reduced as the xDSL data traffic is transmitted upstream (indicated by directional arrow 38) toward the Internet 34. Therefore, a substantial amount of xDSL data traffic that is received at ingress side 40 of DSLAM 36a must be buffered and/or queued prior to transmission from egress side 41, upstream through communication link 42, toward Internet 34. The teachings of the present invention provide a system and method for queuing xDSL data traffic, such that the limited amount of bandwidth available through communication link 42 is fairly distributed amongst users, such that the likelihood of one particular user experiencing delays or loss more often than other users is substantially reduced.

More specifically, xDSL data traffic received at a plurality of input ports 44a-44n of DSLAM 36a is switched at ATM switch 46 and consolidated at a queuing module 48. xDSL data traffic received at each input port 44a-44n include a plurality of virtual circuits 33a-33n. Virtual circuits are consolidated at queuing module 48 and dynamically distributed amongst a plurality of queues 50a-50n associated with queuing module 48. Traffic associated with each queue is then transmitted through communication link 42 in some predetermined order. For example, each queue 50a-50n may be allocated a specific amount of bandwidth from the available bandwidth of communication link 42, for transmitting xDSL data traffic. In a particular embodiment, each queue 50a-50n is allocated an equivalent amount of bandwidth from communication link 42, for transmitting xDSL data traffic received at each queue 50a-50n.

The assignment of a particular virtual circuit to a particular one of queues 50a-50n is determined according to an algorithm. Therefore, queuing module 48 and/or queues 50a-50n include one or more processors and memory modules to execute, record, store and/or manipulate the queues, and/or data associated with the execution or results of the algorithm. In accordance with another embodiment, the assignment scheme described herein may be implemented using a Field Programmable Gate Array (FPGA). The algorithm may be structured such that the assignment of virtual circuits to queues is (i) sequential according to the time at which a connection with the virtual circuit is established by a user; (ii) pseudo-randomly; or (iii) according to a connection admission scheme. Each algorithm will be described later in more detail.

DSLAM 36a is a digital subscriber line access multiplexer. This type of equipment is typically located at a network service provider's site. DSLAMs take traffic from multiple xDSL lines and combine it into higher speeds before sending it to the Internet or other data network. In other words, a DSLAM aggregates the data streams received from xDSL modems and/or other DSLAMs.

The connection between a DSLAM and an Internet service provider or competitive local exchange carrier is a potential site for network congestion. CLECs lease connections between their switches and the DSLAM. If not enough capacity is available, a customer may experience delays or loss. Customers have dedicated capacity between their xDSL modem and the DSLAM, but not between the DSLAM and the Internet or CLEC.

DSLAM 36a includes a plurality of input ports 44a-44n which are coupled with modems 35a-35n and/or other DSLAMs 36b. In the illustrated embodiment, input ports 44a-44c are dedicated to xDSL users. Subtend input ports 44d-44n are dedicated to DSLAM 36b. Therefore, ports 44d-44n may be referred to as subtended input ports. Each input port 44a-44n provides for a connection with a virtual circuit 33a-33n in order to couple DSLAM 36a with xDSL modems or other DSLAMs. In practice, each port includes a plurality of virtual circuits. For the purposes of this specification, virtual circuits 33a-33e are coupled with DSLAM 36a using a physical connections between xDSL modems 35a-35n and DSLAM 36a (e.g. copper pairs), and virtual circuits 33f-33n are coupled with DSLAM 36a using physical connections between DSLAMs 36a and 36b (e.g., fiber or coaxial cables). Each physical connection comprises a plurality of logical circuits (virtual circuits) associated with one of the input ports 44.

Virtual circuits are communication links for voice or data that appear to an end user to be dedicated point-to-point circuits. Virtual circuits are generally set up on a per-call (or connection) basis and disconnected when the call (or connection) is ended. A virtual circuit is referred to as logical, rather than physical path for the transfer of voice or data. Each virtual circuit is identified by a virtual path identifier (VPI) and a virtual circuit identifier (VCI). A VPI is an 8-bit field in an ATM header, identifying the virtual path over which the transmitted data will flow from the transmitting device to the target device. A VCI is a 16-bit field in the ATM cell header identifying the virtual circuit which the data will travel from the transmitting device to a target device. The virtual circuit is contained within a virtual path.

For illustrative purposes, input port 44a is illustrated in FIG. 1 as having a plurality of virtual circuits 33a-33c, associated therewith. Each virtual circuit 33a-33n may be associated with a particular one of users 32a-32n, and/or DSLAM 36b. For example, a single xDSL modem, such as 35a, may have a single dedicated virtual circuit, or may have several dedicated virtual circuits associated therewith, as illustrated in FIG. 1. Furthermore, DSLAM 36b will likely have a plurality of dedicated virtual circuits. Similarly, a particular user and/or DSLAM 36b may have one or more dedicated ports associated therewith, within the teachings of the present invention.

xDSL data traffic received at ports 44a-44n is transmitted to ATM switch 46 and subsequently to queuing module 48. Since DSLAM 36a may receive xDSL data traffic at ports 44a-44n at a faster rate than may be transmitted through communication link 42, queuing module 48 buffers xDSL data and determines the order in which data associated with each virtual circuit will be transmitted through communication link 42.

FIG. 2 illustrates a queue assignment chart 60, in accordance with a particular embodiment of the present invention. For illustrative purposes, the embodiment of FIG. 2 assumes that there are four ports 62a-62d, with six virtual circuits associated with each port, for a total of 24 virtual circuits.

Four priorities 64a-64d of queues have been established, with a total of four queues for each priority. However, in practice, it is expected that queuing module 48 will assign a significantly larger number of virtual circuits to a significantly larger number of queues. As an example, two hundred and fifty modem ports or more may be included within a single DSLAM, with approximately two virtual circuits per port, and two subtend ports (serving subtended DSLAMs) having five hundred virtual circuits each for a total of fifteen hundred virtual circuits. Assuming that four priorities are desired, each priority may include a total of twenty-five queues each, for a total of one hundred queues to be assigned.

For illustrative purposes, each virtual circuit of FIG. 2 is identified by port number, and virtual circuit number. Therefore, the fifth virtual circuit associated with the second port is identified as VC2,5. In a similar manner, queues are identified by priority number and queue number. Therefore, the third queue in the second priority is identified as Q2,3. These designations will be used throughout this specification, to indicate queue assignments for each virtual circuit.

Since there is less bandwidth available upstream, it is expected that xDSL data traffic associated with any particular virtual circuit will be queued, or buffered, before being transmitted through communication link 42. The present invention provides a system and method for assigning virtual circuits to queues, such that the available bandwidth is fairly distributed amongst users.

To illustrate this point, assume that there are a total of ten thousand virtual circuits associated with DSLAM 36a. If a total of ten thousand queues are used, then each virtual circuit will be assigned its own queue. This will allow all available bandwidth to be distributed evenly amongst all virtual circuits such that each virtual circuit has the same amount of bandwidth, and all users are therefore treated equally.

Each queue used in a particular DSLAM adds expense, due to the increase in complexity to the hardware, and/or software associated with each queue. Therefore, it is not practical to have a queue assigned to each virtual circuit.

When less queues are used than virtual circuits, it is necessary for virtual circuits to share queues. This can create problems for some users, if they are grouped with "bandwidth abusers". For purposes of this specification, the term "bandwidth abuser" refers to a user who uses a disproportionate amount of bandwidth, relative to other users. For example, a particular virtual circuit may be dedicated to a first user, or household, which uses the connection for occasional internet surfing, and email. Another virtual circuit may be assigned to a second user, or household which often uses the connection to send or receive high quality streaming video, which uses a significant amount of bandwidth. In this scenario, the second user may be considered a bandwidth abuser.

If virtual circuits were permanently assigned to queues, any user who was forced to share a queue with the bandwidth abuser would be unfairly affected by the bandwidth abuser, since the bandwidth abuser would use more than his share of bandwidth assigned to that particular queue. Therefore, the present invention does not incorporate a scheme in which each virtual circuit is permanently assigned to a particular queue. Instead, in accordance with the teachings of the present invention, virtual circuits are assigned to queues dynamically, and/or intelligently, in a manner that avoids any particular user from being continuously affected by the same abuser, which would happen if the assignments were permanent.

In accordance with one embodiment of the present invention, virtual circuits are assigned to queues based upon a sequential assignment scheme. In this embodiment, the order of assignment will depend upon when the connection is established, for example the time at which the xDSL modem is activated. Although a xDSL modem is typically "always-on", a new connection may be established each time the modem is disconnected and/or the connection to the virtual circuit is terminated. Therefore, a user that experiences problems can simply reboot the modem, or perform another task that takes the xDSL modem temporarily "offline" and receive a new queue assignment when the connection is re-established.

Referring again to FIG. 2, an assignment scheme using sequential assignment is illustrated. Assume that connections are established by users with virtual circuits VC1,4; VC1,5; VC2,1; VC2,5; VC3,5 and VC4,4; in that order (with respect to a timeline). If virtual circuits VC1,4; VC1,5; VC2,1 are designated with a priority of 2, and virtual circuits VC2,5; VC3,5 and VC4,4 are designated with a priority of 3, then the assignments would be as indicated with asterisks (*) in FIG. 2. Following suit, the first virtual circuit with an active connection that has a priority 4 will be assigned to Q4,1, and so on. It should be recognized that more than one virtual circuit may be assigned to a single queue, and likely will be, in practice. Furthermore, it should be recognized that each virtual circuit of FIG. 2 may be assigned to one of the queues; the six assignments shown are for illustrative purposes only.

In another embodiment, virtual circuits are assigned to queues in a pseudo-random manner. For example, when a priority three connection is established with a virtual circuit, that virtual circuit is "randomly" assigned to one of the queues associated with priority number three (one of queues Q3,1; Q3,2; Q3,3; Q3,4). In a similar manner, each virtual circuit is randomly assigned as connections are established. This avoids any two users sharing a queue on a regular basis, as the law of averages suggests that no two users will be assigned to the same queue very often.

In a third embodiment, assignments of virtual circuits to queues may be accomplished according to a "connection admission" scheme. "Connection admission" refers to any scheme which takes into account the amount, quality, or other bandwidth characteristic associated with the virtual circuit connection. Such characteristics may include one or more of peak cell rate (PCR), sustained cell rate (SCR), maximum burst rate (MBR), and/or cell delay variation (CDV). These characteristics refer to the quantity and/or quality of bandwidth required of a particular connection, or virtual circuit.

Peak cell rate is a parameter defined by the ATM Forum for ATM traffic management. In constant bit rate (CBR) transmissions, the peak cell rate parameter determines how often data samples are sent. In available bit rate (ABR) transmissions, the peak cell rate parameter determines the maximum value of the available cell rate. Sustained cell rate refers to the maximum cell rate which will be maintained for a predetermined period of time. Maximum burst is an ATM parameter that specifies the largest burst of data above the insured and maximum rates that will be allowed temporarily on an ATM virtual circuit, but will not be dropped at the edge by the traffic-policing function.

On average, the traffic needs to be within the maximum rate. This parameter is typically specified in bytes or cells. Cell delay variation is an ATM term which refers to the amount of acceptable jitter associated with a particular transmission.

This allows bandwidth abusers, or others that require more bandwidth to be distributed approximately evenly amongst the available queues. For example, assume that a user having a very high PCR requirement connects to a virtual circuit. That VC would not be assigned to a queue that already has a user with a high PCR requirement assigned to it. In a similar manner, if a disproportionate amount of users are already assigned to a particular queue, then a user with a high PCR requirement would not be assigned to that particular queue.

This scheme allows queuing module 48 to compare the bandwidth characteristics associated with a particular virtual circuit connection request with the bandwidth characteristics of virtual circuits already assigned throughout the system. In this manner, queuing module 48 may intelligently decide which queue to place the virtual circuit in, in a manner that approximately evenly distributes the amount and quality of bandwidth available amongst users such that two users that will or potentially will require a disproportionate amount of bandwidth will not be grouped together. Moreover, all assignments of virtual circuits to queues may be made according to the anticipated amount or quality of bandwidth required of each particular virtual circuit. This avoids a situation where one particular user is grouped in the same queue with one or more abusers.

It should be recognized that queues need not be associated with a particular priority. In the illustrated embodiment, it is assumed that the connection established by each virtual circuit includes a specified priority. The priority may be assigned by the service provider that provides the user with the xDSL modem and/or xDSL access services. This priority scheme allows a service provider to provide different "grades" of service. For example, residential users may all be assigned as fourth (lowest) priority, and charged rates which take into account the reduced quality of service (QoS). A business that streams quality video to other users on a regular basis may need a higher QoS (e.g., priority one). Since many existing xDSL service providers apply this type of priority scheme, the present invention may incorporate such priorities.

In another embodiment, all virtual circuits may be assumed to have an equal priority. In this embodiment, any of the schemes described herein may be employed to assign virtual circuits to queues, without regard to a predetermined priority. For example, instead of four priorities having twenty-five queues each, one hundred queues of equal priority may be provided. Therefore, according to the pseudo-random scheme, for example, the first connection received will be assigned to any one of the one hundred queues, in a random manner.

Figure 3:
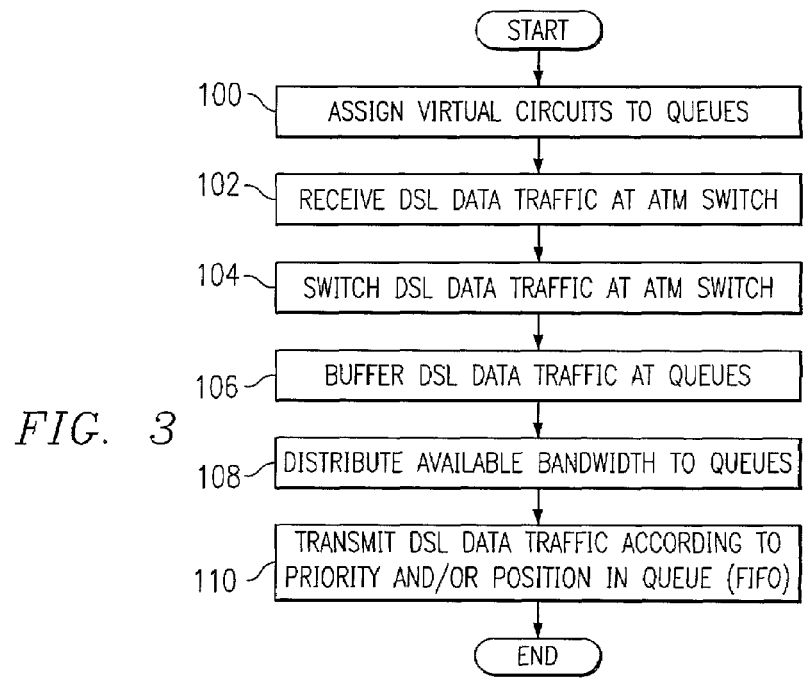
FIG. 3 illustrates a method for assigning virtual circuits to output queues, in accordance with a particular embodiment of the present invention.

FIG. 3 illustrates a method for distributing digital subscriber line (xDSL) data traffic, in accordance with another embodiment of the present invention. All virtual circuits are essentially pooled in order to assign virtual circuits to queues at step 100. Accordingly, the assignment of virtual circuits to queues that is accomplished at step 100 is independent of the port associated with a particular virtual circuit. However, in some embodiments, the assignment of virtual circuits to queues may be done according to the "priority" assigned to the particular virtual circuit. In such embodiments, each queue is assigned a specific priority, and virtual circuits having that priority are assigned to one of a plurality of queues having the same priority assignment. It should be recognized that in other embodiments, the assignment of virtual circuits to queues may be done independent of any priority associated with the virtual circuit. In fact, a virtual circuit need not have an associated predefined priority in order to assign virtual circuits to queues at step 100.

There are other methods available for distributing VCs to queues. For example, a per-port, per-priority scheme may be used. According to this method, a queue is assigned to each priority of each port. Therefore, a DSLAM having one hundred ports and four priorities per port would have four hundred queues. In accordance with this scheme, any two users sharing a port, with the same priority, would necessarily share the same queue. This treats some users unfairly because they may be forced to share the queue with the same bandwidth abuser, at all times.

Another method for assignment of queues is referred to as per-virtual circuit assignment. This requires that a separate queue is available for each virtual circuit. Although this is possible to do, it is extremely expensive and impractical.

At step 102 xDSL data traffic is received at a digital subscriber line access multiplexer (DSLAM). The xDSL data traffic is received at a plurality of ports associated with the DSLAM. Each port includes a plurality of virtual circuits which effectively divide the port into a plurality of logical circuits. For example, each virtual circuit may be dedicated to a particular user, or a plurality of virtual circuits may be dedicated to a particular user. Many of the virtual circuits may also be dedicated to other DSLAMs in the communication system (referred to as "subtended" DSLAMs). Each user and/or each virtual circuit may be classified into one of a plurality of priorities. This allows a service provider to distinguish the quality of service (QoS) associated with each virtual circuit and/or user.

At step 104 the xDSL data traffic is switched at ATM switch fabric associated with the DSLAM. Since there is typically less bandwidth available upstream, switching at the ATM switch fabric may be referred to as multiplexing the xDSL data traffic.

Next, at step 106, the xDSL data traffic is buffered at the pre-assigned queues. Since the DSLAM typically has less bandwidth available upstream, it is often necessary to buffer xDSL data traffic and transmit the xDSL data traffic in a predetermined order, such that the available bandwidth is shared amongst a plurality of queues. Accordingly, at step 108, available bandwidth is distributed amongst the plurality of queues according to a predetermined distribution scheme. One such scheme would require that each queue is allocated an equivalent amount of available bandwidth. Another scheme may require that queues having a higher priority are assigned a relatively larger amount of bandwidth than queues having a lower priority.

Finally, at step 110 xDSL data traffic is transmitted from the DSLAM according to its position in one of a plurality of queues, and/or the priority of the virtual circuit and/or queue in which the xDSL data traffic resides. Typically xDSL data traffic is transmitted from any particular queue according to a first-in, first-out (FIFO) distribution scheme.

The order in which each queue is allowed to transmit xDSL data traffic is determined according to a scheduling algorithm. For example, the algorithm may be a strict round robin (SRR) or a weighted round robin (WRR) scheduling algorithm.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for distributing digital subscriber line (xDSL) data traffic, comprising:
   receiving xDSL data traffic at a DSLAM including a plurality of input ports and a plurality of output queues, each input port comprising a plurality of virtual circuits (VCs);
   dynamically assigning each of the plurality of virtual circuits to one of the plurality of output queues;
   wherein the assignment of any particular virtual circuit to one of the plurality of output queues is independent of which one of the plurality of input ports the particular virtual circuit is associated with; and
   wherein a total number of virtual circuits is greater than a total number of output queues.

2. The method of claim 1, wherein dynamically assigning each of the plurality of virtual circuits to one of the plurality of output queues comprises randomly assigning each virtual circuit to any one of the plurality of output queues.

3. The method of claim 1, wherein dynamically assigning each of the plurality of virtual circuits to one of the plurality of output queues comprises sequentially assigning each virtual circuit to one of the plurality of output queues based upon an order in which connections associated with the virtual circuits are established.

4. The method of claim 1, further comprising:
   receiving bandwidth requirements, each bandwidth requirement being associated with one of the virtual circuits; and
   wherein dynamically assigning each of the plurality of virtual circuits to one of the plurality of output queues comprises assigning each virtual circuit to one of the plurality of output queues in a manner that approximately evenly distributes the bandwidth requirements amongst the output queues.

5. The method of claim 4, wherein the bandwidth requirements comprise sustained cell rates (SCRs) and peak cell rates (PCRs).

6. The method of claim 4, wherein the bandwidth requirements comprise maximum burst sizes (MBSs).

7. The method of claim 4, wherein the bandwidth requirements comprise cell delay variations (CDVs).

8. The method of claim 1, further comprising:
   receiving a plurality of priorities, each priority being associated with one of the plurality of virtual circuits; and
   wherein each output queue is associated with one of the plurality of priorities.

9. The method of claim 8, wherein the total number of output queues is greater than a product of a total number of priorities times the total number of input ports.

10. The method of claim 1, wherein the xDSL data traffic is received from an ATM switch prior to the step of dynamically assigning each virtual circuit to any one of the plurality of output queues.

11. A digital subscriber line access multiplexer (DSLAM), comprising:
    a plurality of input ports being operable to receive xDSL data traffic from a communication network, each input port comprising a plurality of virtual circuits (VCs);
    a queuing module being operable to dynamically assign each virtual circuit to one of a plurality of output queues;
    wherein the assignment of any particular virtual circuit to one of the plurality of output queues is independent of which one of the plurality of ports the particular virtual circuit is associated with; and
    wherein a total number of virtual circuits is greater than a total number of output queues.

12. The apparatus of claim 11, wherein the queuing module is further operable to randomly assign each virtual circuit to any one of the plurality of output queues.

13. The apparatus of claim 12, wherein the queuing module is operable to sequentially assign each virtual circuit to one of the plurality of output queues based upon an order in which connections associated with the virtual circuits are established.

14. The apparatus of claim 11, wherein the queuing module is operable to receive bandwidth requirements, each bandwidth requirement being associated with one of the virtual circuits, and wherein the queuing module is further operable to assign each virtual circuit to one of the plurality of output queues in a manner that approximately evenly distributes the bandwidth requirements amongst the output queues.

15. The apparatus of claim 14, wherein the bandwidth requirements comprise sustained cell rates (SCRs) and peak cell rates (PCRs).

16. The apparatus of claim 14, wherein the bandwidth requirements comprise maximum burst sizes (MBSs).

17. The apparatus of claim 14, wherein the bandwidth requirements comprise cell delay variations (CDVs).

18. The apparatus of claim 11, wherein the queuing module is further operable to receive a plurality of priorities, each priority being associated with one of the plurality of virtual circuits, and wherein each output queue is associated with one of the plurality of priorities.

19. The apparatus of claim 18, wherein the total number of output queues is greater than a product of a total number of priorities times the total number of input ports.

20. The apparatus of claim 11, wherein the xDSL data traffic is received from an ATM switch prior to assigning each virtual circuit to any one of output queues.

21. A computer including logic encoded in media for distributing digital subscriber line (xDSL) data traffic, the logic being operable to, when executed on the computer:
    receive xDSL data traffic at a DSLAM including a plurality of input ports and a plurality of output queues, each input port comprising a plurality of virtual circuits;
    dynamically assign each of the plurality of virtual circuits to one of the plurality of output queues;
    wherein the assignment of any particular virtual circuit to one of the plurality of output queues is independent of which one of the plurality of input ports the particular virtual circuit is associated with; and
    wherein a total number of virtual circuits is greater than a total number of output queues.

22. The computer of claim 21, wherein the logic is further operable to randomly assign each virtual circuit to any one of the plurality of output queues.

23. The computer of claim 21, wherein the logic is further operable to sequentially assign each virtual circuit to one of the plurality of output queues based upon an order in which connections associated with the virtual circuits are established.

24. The computer of claim 21, wherein the logic is further operable to:
    receive bandwidth requirements, each bandwidth requirement being associated with one of the virtual circuits; and
    wherein the logic is further operable to assign each virtual circuit to one of the plurality of output queues in a manner that approximately evenly distributes the bandwidth requirement amongst the output queues.

25. The computer of claim 21, wherein the logic is further operable to:

receive a plurality of priorities, each priority being associated with one of the plurality of virtual circuits; and wherein each output queue is associated with one of the plurality of priorities.

26. A system for distributing digital subscriber line (xDSL) data traffic, comprising:

means for receiving xDSL data traffic at a DSLAM including a plurality of input ports, and a plurality of output queues, each input port comprising a plurality of virtual circuits (VCs);

means for dynamically assigning each of the plurality of virtual circuits to one of the plurality of output queues;

wherein the assignment of any particular virtual circuit to one of the plurality of output queues is independent of which one of the plurality of input ports the particular virtual circuit is associated with; and wherein a total number of virtual circuits is greater than a total number of output queues.

27. The system of claim 26, wherein dynamically assigning each of the plurality of virtual circuits to one of the plurality of output queues comprises randomly assigning each virtual circuit to any one of the plurality of output queues.

28. The system of claim 26, wherein dynamically assigning each of the plurality of virtual circuits to one of the plurality of output queues comprises sequentially assigning each virtual circuit to one of the plurality of output queues based upon an order in which connections associated with the virtual circuits are established.

29. The system of claim 26, further comprising:

means for receiving bandwidth requirements, each bandwidth requirement being associated with one of the virtual circuits; and wherein dynamically assigning each of the plurality of virtual circuits to one of the plurality of output queues comprises assigning each virtual circuit to one of the plurality of output queues in a manner that approximately evenly distributes the bandwidth requirements amongst the output queues.

30. The system of claim 26, further comprising:

means for receiving a plurality of priorities, each priority being associated with one of the plurality of virtual circuits; and wherein each output queue is associated with one of the plurality of priorities.

* * * * *